(12) United States Patent
Wan et al.

(10) Patent No.: US 10,172,415 B2
(45) Date of Patent: Jan. 8, 2019

(54) SOLE ASSEMBLY FORMED FROM MULTIPLE PREFORMS AND METHOD AND MOLD FOR MANUFACTURING SAME

(71) Applicant: NIKE, Inc., Beaverton, OR (US)

(72) Inventors: Tee L. Wan, Portland, OR (US); Thienchai Chaisumrej, Bangkok (TH); Chia-Yi Wu, Long An Province (VN); Yu-Chen Lin, Taipei (TW)

(73) Assignee: NIKE, INC., Beaverton, OR (US)

( * ) Notice: Subject to any disclaimer, the term of this patent is extended or adjusted under 35 U.S.C. 154(b) by 662 days.

(21) Appl. No.: 14/252,076

(22) Filed: Apr. 14, 2014

(65) Prior Publication Data
US 2015/0289586 A1 Oct. 15, 2015

(51) Int. Cl.
| | | |
|---|---|---|
| *A43B 13/14* | (2006.01) | |
| *A43B 9/00* | (2006.01) | |
| *A43B 13/16* | (2006.01) | |
| *B29D 35/12* | (2010.01) | |
| *A43B 13/12* | (2006.01) | |
| *B29D 35/04* | (2010.01) | |
| *B29D 35/14* | (2010.01) | |

(52) U.S. Cl.
CPC ............ *A43B 13/16* (2013.01); *A43B 13/125* (2013.01); *B29D 35/04* (2013.01); *B29D 35/122* (2013.01); *B29D 35/142* (2013.01)

(58) Field of Classification Search
CPC .... A43B 9/02; A43B 9/16; A43B 9/18; A43B 9/20; A43B 13/12; B29D 35/0054; B29D 35/122; B29D 35/142; B29C 34/145; B29C 34/146; B29C 34/18; B22C 9/02

USPC ........................................................ 12/142 B
See application file for complete search history.

(56) References Cited

U.S. PATENT DOCUMENTS

| | | | | |
|---|---|---|---|---|
| 4,307,521 A | * | 12/1981 | Inohara | ........... A43B 13/12 36/31 |
| 8,246,881 B2 | * | 8/2012 | Maranan | ............ A43B 13/125 264/238 |
| 2004/0056377 A1 | * | 3/2004 | Hsu | ........................ B29C 44/06 264/45.4 |

(Continued)

FOREIGN PATENT DOCUMENTS

| | | |
|---|---|---|
| CN | 102960898 A | 3/2013 |
| DE | 19812694 A1 | 3/1999 |

(Continued)

OTHER PUBLICATIONS

Jul. 9, 2015—International Search Report and Written Opinion—PCT/US2015/023799.

*Primary Examiner* — Timothy K Trieu
(74) *Attorney, Agent, or Firm* — Banner & Witcoff, Ltd.

(57) ABSTRACT

An article of footwear includes an upper and a sole assembly positioned beneath the upper. The sole assembly has a vertically extending channel formed in its bottom surface inward of a periphery of the sole assembly, the channel including opposed sidewalls and an end surface. The sole assembly includes a first portion having a first color; and a second portion having a second color that is different than the first color. An interface between the first portion and the second portion is positioned at a central portion of one of the sidewalls of the channel. A method of forming such an article of footwear is also disclosed.

19 Claims, 2 Drawing Sheets

(56) References Cited

U.S. PATENT DOCUMENTS

| | | | |
|---|---|---|---|
| 2005/0276954 A1* | 12/2005 | Bramani | A43B 1/0027 428/195.1 |
| 2008/0073806 A1* | 3/2008 | Wang | B29C 33/0061 264/45.1 |
| 2008/0083485 A1* | 4/2008 | Chi | A43B 9/18 156/245 |
| 2009/0094858 A1* | 4/2009 | Ungari | B29C 47/30 36/88 |
| 2011/0283560 A1* | 11/2011 | Portzline | A43B 13/04 36/31 |
| 2012/0304501 A1 | 12/2012 | Song | |
| 2013/0036627 A1 | 2/2013 | Wan et al. | |

FOREIGN PATENT DOCUMENTS

| | | |
|---|---|---|
| KR | 10-0256180 B1 | 5/2000 |
| WO | 2008019980 A2 | 2/2008 |
| WO | 2010045144 A2 | 4/2010 |
| WO | 2013023135 A1 | 2/2013 |

\* cited by examiner

SOLE ASSEMBLY FORMED FROM MULTIPLE PREFORMS AND METHOD AND MOLD FOR MANUFACTURING SAME

FIELD

Aspects of this invention relate generally to a sole assembly for an article of footwear, and, in particular, to a sole assembly formed from two preforms and a method and mold for manufacturing such a sole assembly.

BACKGROUND

Conventional articles of athletic footwear include two primary elements, an upper and a sole assembly. The upper provides a covering for the foot that comfortably receives and securely positions the foot with respect to the sole assembly. In addition, the upper may have a configuration that protects the foot and provides ventilation, thereby cooling the foot and removing perspiration. The sole assembly is secured to a lower portion of the upper and is generally positioned between the foot and the ground. In addition to attenuating ground reaction forces, the sole assembly may provide traction, control foot motions (e.g., by resisting over pronation), and impart stability, for example. Accordingly, the upper and the sole assembly operate cooperatively to provide a comfortable structure that is suited for a wide variety of activities, such as walking and running. An insole may be located within the upper and adjacent to a plantar (i.e., lower) surface of the foot to enhance footwear comfort, and is typically a thin, compressible member.

The sole assembly may incorporate multiple layers. Some footwear include only a midsole, while others may also include an outsole secured to a bottom surface of the midsole. The midsole, which is conventionally secured to the upper along the length of the upper, is primarily responsible for attenuating ground reaction forces. The midsole may also form the ground-contacting element of footwear. In such embodiments, the midsole may include texturing, such as projections and recesses or grooves, in order to improve traction. The outsole, when present, forms the ground-contacting element and may be fashioned from a durable, wear-resistant material.

The midsole may be primarily formed from a resilient, polymer foam material, such as ethylvinylacetate (EVA), that extends throughout the length of the footwear. The properties of the polymer foam material in the midsole are primarily dependent upon factors that include the dimensional configuration of the midsole and the specific characteristics of the material selected for the polymer foam, including the density of the polymer foam material. By varying these factors throughout the midsole, the relative stiffness and degree of ground reaction force attenuation may be altered to meet the specific demands of the activity for which the footwear is intended to be used. In addition to polymer foam materials, conventional midsoles may include, for example, one or more fluid-filled bladders and moderators.

The sole assembly may be formed of multiple portions, with some or all of the portions having different colors. When EVA is formed in a mold assembly the color lines between the different colored portions may bleed, decreasing the aesthetic appeal of the footwear.

It would be desirable to provide a midsole formed from two preforms and a method and mold for manufacturing such a midsole that reduces or overcomes some or all of the difficulties inherent in prior known devices. Particular advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide a sole assembly formed of preforms having different colors and a method of manufacturing such a sole assembly.

In accordance with a first aspect, a method of manufacturing a midsole for an article of footwear includes placing a first preform into a first recess in a first mold member of a mold assembly. The first mold member includes a plurality of projections extending upwardly from a bottom surface of the first recess, with each projection positioned inwardly from a peripheral edge of the first recess. A second preform is placed on the first preform such that interfaces between a top surface of the first preform and a bottom surface of the second preform are positioned adjacent central portions of the projections. The mold assembly is closed by positioning a second mold member in contact with the first mold member, with the first and second mold members cooperating to define a midsole recess. The mold is maintained for a predetermined period of time at a predetermined temperature such that the first and second preforms bond together to form a first portion and a second portion, respectively, of a sole assembly within the midsole recess. The sole assembly is removed from the mold.

In accordance with another aspect, a method of manufacturing a midsole for an article of footwear includes placing a first preform into a first recess in a first mold member of a mold assembly, with the first preform having a first color, the first mold member including a plurality of projections extending upwardly from a bottom surface of the first recess, and each projection positioned inwardly from a peripheral edge of the first recess. A plurality of additional preforms are placed on the first preform such that each interface between a top surface of the first preform and a bottom surface of each additional preform is positioned adjacent a central portion of one of the projections, with at least some of the additional preforms having a different color than the first color. The mold assembly is closed by positioning a second mold member in contact with the first mold member, with the first and second mold members cooperating to define a midsole recess. The mold is maintained for a predetermined period of time at a predetermined temperature such that the preforms bond together to form a sole assembly within the midsole recess, and the sole assembly is removed from the mold.

In accordance with a further aspect, an article of footwear includes an upper and a sole assembly positioned beneath the upper. The sole assembly has a vertically extending channel formed in its bottom surface inward of a periphery of the sole assembly, the channel including opposed sidewalls and an end surface. The sole assembly includes a first portion having a first color; and a second portion having a second color that is different than the first color. An interface between the first portion and the second portion is positioned at a central portion of one of the sidewalls of the channel.

By providing a sole assembly formed from multiple preforms and a method and mold for manufacturing such a sole assembly, footwear with improved aesthetic appeal can be produced. These and additional features and advantages disclosed here will be further understood from the following detailed disclosure of certain embodiments.

Figure 1:
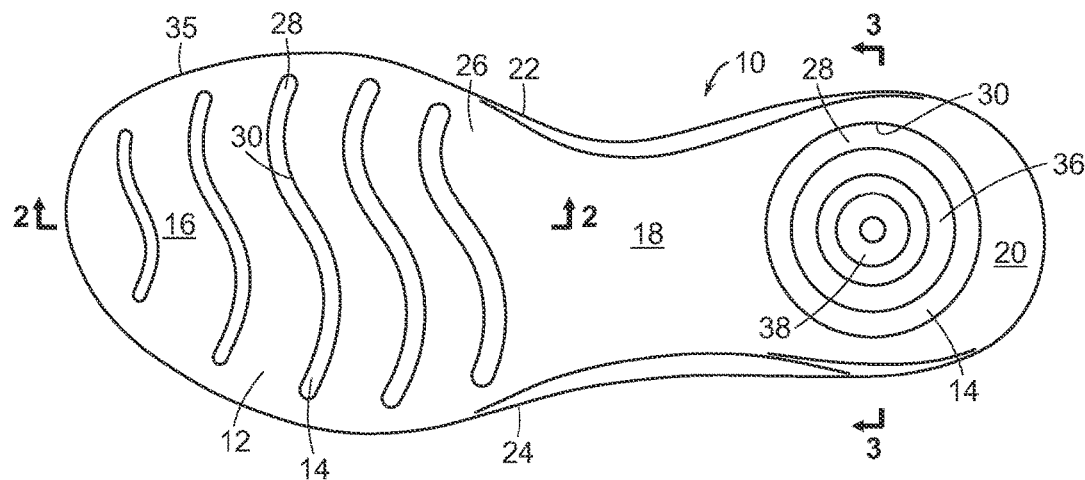
FIG. 1 is a plan view of bottom of a sole assembly of an article of footwear formed from preforms.

The figures referred to above are not drawn necessarily to scale, should be understood to provide a representation of particular embodiments of the invention, and are merely conceptual in nature and illustrative of the principles involved. Some features of the mold assembly used to form a sole assembly formed of different preforms and related methods of manufacture depicted in the drawings have been enlarged or distorted relative to others to facilitate explanation and understanding. The same reference numbers are used in the drawings for similar or identical components and features shown in various alternative embodiments. Mold assemblies used for forming midsoles as disclosed herein would have configurations and components determined, in part, by the intended application and environment in which they are used.

DETAILED DESCRIPTION OF CERTAIN PREFERRED EMBODIMENTS

A sole assembly 10 for an article of footwear is depicted in FIG. 1. It is to be appreciated that in certain embodiments, sole assembly 10 may serve as a midsole, with an outsole (not shown) being secured to the bottom surface of the midsole. In other embodiments, as illustrated here, the bottom surface of sole assembly 10 serves as the ground-engaging portion (or other contact surface-engaging portion) of the article of footwear.

Sole assembly 10 includes a first portion 12 formed of a first material having a first color, and a second portion 14 formed of a second material having a second color, where the second color is a different color than the first color.

In certain embodiments, the first and second materials may also have different physical properties and, therefore, different performance characteristics. For example, the hardness of the various portions may be different. It is to be appreciated that any of the known physical properties or performance characteristics for sole assemblies can be different for the different portions of sole assembly 10, thereby altering the support, cushioning, load carrying capability, wear characteristics, and tread life of sole assembly 10, for example. Other suitable physical properties or performance characteristics will become readily apparent to those skilled in the art, given the benefit of this disclosure.

Sole assembly 10 serves to provide shock-attenuation and energy-absorption for an article of footwear. Sole assembly 10 can be used for any of various articles of casual footwear having configurations suitable, for example, for walking or lounging. Sole assembly 10 may also be included as part of a wide range of athletic footwear styles, including shoes that are suitable for soccer, running, basketball, baseball, cross-training, football, rugby, tennis, and volleyball, for example. An individual skilled in the relevant art will appreciate, therefore, that the concepts disclosed herein with regard to sole assembly 10 may be applied to a wide variety of footwear styles, in addition to the specific styles discussed herein and depicted in the accompanying figures.

For purposes of reference in the following description, sole assembly 10 may be divided into three general regions: a forefoot region 16, a midfoot region 18, and a heel region 20. Regions 16-20 are not intended to demarcate precise areas of sole assembly 10. Rather, regions 16-20 are intended to represent general areas of sole assembly 10 that provide a frame of reference during the following discussion. Although regions 16-20 apply generally to sole assembly 10, references to regions 16-20 also may apply specifically to first portion 12, second portion 14, or individual components or portions of sole assembly 10.

For purposes of reference, sole assembly 10 includes a medial side 22 and an opposite lateral side 24. Lateral side 24 is positioned to extend along a lateral side of the foot (i.e., the outside) and generally passes through each of regions 16-20. Similarly, medial side 22 is positioned to extend along an opposite medial side of the foot (i.e., the inside) and generally passes through each of regions 16-20.

As noted above, a separate outsole member may be secured to a bottom surface 26 of sole assembly 10, and serve as the ground-engaging surface of the footwear. In other embodiments, bottom surface 26 itself may serve as the ground-engaging surface of the footwear.

In known fashion, an upper may be secured to the upper surface of sole assembly 10 in order to fully form the footwear. The upper may be secured to sole assembly 10 with an adhesive, or in any other known fashion. The upper is not shown here as those skilled in the art are well aware of how an upper is secured to a midsole, and, therefore, such a drawing is not necessary for an understanding of the invention.

The materials used to form first portion 12 and second portion 14 of sole assembly 10 may I be injection phylon (Ethylene Vinyl Acetate or "EVA"). The EVA may have a Vinyl Acetate (VA) level between approximately 9% and approximately 40%. Suitable EVA resins include Elvax®, provided by DuPont, and Engage, provided by the Dow Chemical Company, for example. In certain embodiments, the EVA may be formed of a combination of high melt index and low melt index material. For example, the EVA may have a melt index between approximately 1 and approximately 50.

The EVA may also include various components including a blowing agent. The blowing agent may have a percent weight between approximately 10% and approximately 20%. Suitable blowing agents include azodicarboamide, for example. In certain embodiments, a peroxide-based curing agent, such as dicumyl peroxide may be used. The amount of curing agent may be between approximately 0.6% and approximately 1.5%. The EVA may also include homogenizing agents, process aids, and waxes. For example, a mixture of light aliphatic hydrocarbons such as Struktol® 60NS may be included. The EVA may also include other constituents such as a release agent (e.g., stearic acid), activators (e.g., zinc oxide), fillers (e.g., magnesium carbonate), pigments, and clays.

Other suitable materials for first portion 12 and second portion 14 will become readily apparent to those skilled in the art, given the benefit of this disclosure.

As noted above, first portion 12 is formed of a material having a first color, while second portion 14 is formed of a material formed of a second color that is different than the first color. First and second portions 12, 14 may also have different physical properties. For example, first and second portions 12, 14 may have different hardnesses, densities, specific gravities, or any other desired physical property. Other suitable physical properties for which the first and second portions may have different values will become readily apparent to those skilled in the art, given the benefit of this disclosure.

Figure 2:
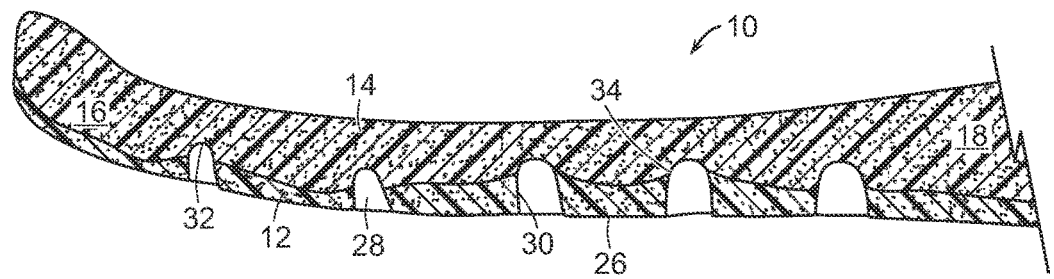
FIG. 2 is a section view of a portion of the sole assembly of FIG. 1.
Figure 3:
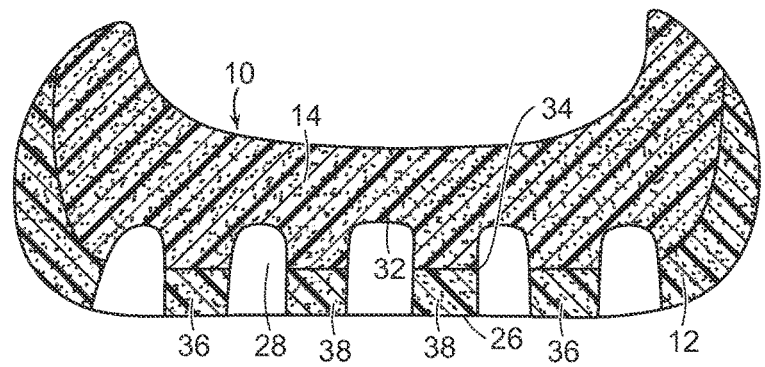
FIG. 3 is a section view of a heel portion of the sole assembly of FIG. 1.

As seen in FIGS. 1-3, bottom surface 26 of sole assembly 10 includes a plurality of vertically extending channels 28. Each channel 28 extends upwardly from its open end at bottom surface 26 with opposing sidewalls 30 and an end surface 32, which is seen in FIG. 2 as an upper surface of channel 28. The intersecting surfaces or interfaces 34 between first portion 12 and second portion 14 are positioned along a central portion of sidewall 30, above bottom surface 26 and below end surface 32.

By positioning interfaces 34 along a central portion of sidewalls 30, any bleeding between the two different colors of first portion 12 and second portion 14, which can occur during the molding process and can produce an uneven line along interface 34, is not visible from an exterior of sole assembly 10 when sole assembly 10 is viewed straight on from the bottom, along the surfaces of channel 28, as viewed in FIG. 1. One would need to look at sole assembly 10 at an angle and look into channel 28 to be able to see any variance in the line forming interface 34. Thus, the aesthetics of sole assembly 10 are improved by positioning interfaces 34 along a central portion of sidewalls 30.

It is to be appreciated that channels 28 can have any desired shape, and can be positioned at any desired location inboard of an external periphery 35 of sole assembly 10. In the embodiment illustrated in FIG. 1, a plurality of channels 28 are positioned in forefoot region 16 of sole assembly 10. These channels 28 are substantially S-shaped, being formed of a compound curve.

Channels 28 can have linear or non-linear shapes. For example, in the embodiment shown in FIG. 1, channels 28 formed in heel region 20 form concentric circles. In other embodiments, channels 28 could be formed to define one or more other shapes, such as a grid or array of hexagons, rectangles, or any other polygons or other shapes. Other suitable shapes for channels 28 will become readily apparent to those skilled in the art, given the benefit of this disclosure.

In certain embodiments, more than two portions can be used to form sole assembly 10, in order to introduce additional colors to sole assembly 10. As illustrated in FIGS. 1 and 3, a third portion 36 having a third color that is different than the first and second colors is seen positioned in heel region 20 of sole assembly 10. A fourth portion 38, having a fourth color that is different than the first, second, and third colors, is also seen positioned in heel region 20 of sole assembly 10. In the illustrated embodiment, third portion 36 and fourth portion 38 are concentric circles. It is to be appreciated that any number of colors can be used for different portions of sole assembly 10.

Figure 4:
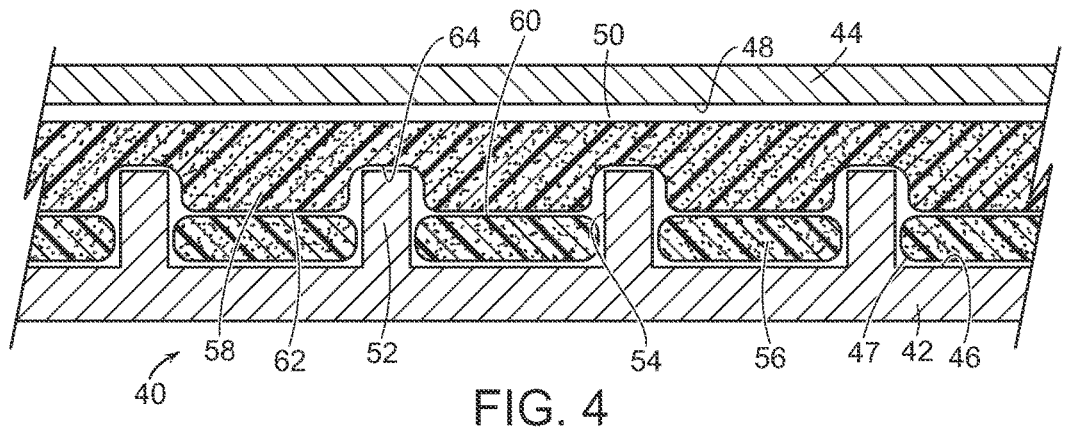
FIG. 4 is a section view of first and second preforms of the sole assembly of FIG. 1, shown in a mold assembly used to form the sole assembly.
Figure 5:
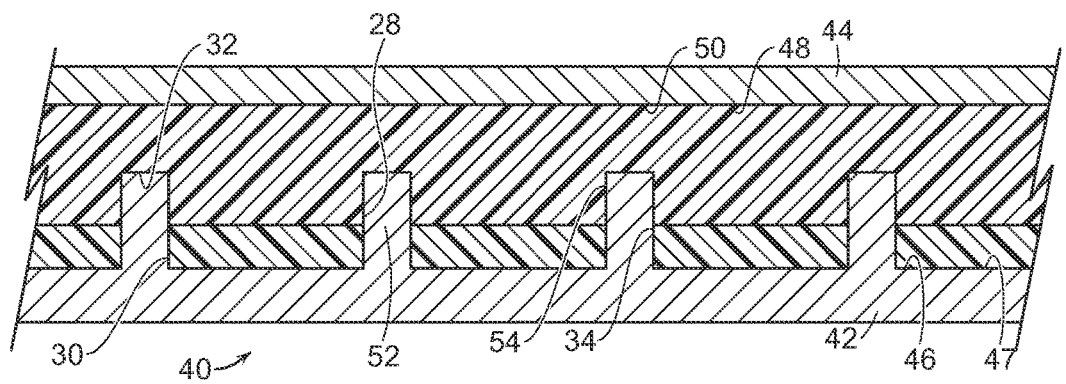
FIG. 5 is a section view of the mold assembly of FIG. 4 after the sole assembly has been formed from the preforms.

A mold assembly 40 used to form sole assembly 10 is illustrated in FIGS. 4-5, and includes a bottom or first portion 42, and a top or second portion 44. An upper or top surface 46 of a first recess 47 of first portion 42 and a lower or bottom surface 48 of second portion 44 cooperate to define a midsole recess 50. In the illustrated embodiment, first portion 42, which is positioned beneath second portion 44, forms bottom surface 26 of sole assembly 10, while second portion 44 forms a top surface of sole assembly 10. It is to be appreciated that in other embodiments, first and second portions 42, 44 can have a different positional relationship with respect to one another.

First portion 42 includes a plurality of projections 52 that extend upwardly from upper surface 46 and have vertically extending sides or sidewalls 54. As sole assembly 10 is formed in mold assembly 40, projections 52 serve to form the corresponding channels 28 in sole assembly 10 as described in greater detail below.

In one method of forming sole assembly 10 in mold assembly 40, mold assembly 40 is at an ambient temperature when first preform 56 and second preform 58 are placed in mold assembly 40, and mold assembly is then heated as discussed above. In one method of forming sole assembly 10 in mold assembly 40, one or more first preforms 56 and one or more second preforms 58, which have previously been formed in known fashion in one or more separate mold assemblies, are positioned in midsole recess 50 of a heated mold assembly 40. As discussed above, in certain embodiments, first and second preforms 56, 58 are formed of EVA.

A release agent may be applied to the exposed surface of first and second preforms 56, 58 and/or the surfaces of midsole recess 50 of first portion 42 and second portion 44 of mold assembly 40 in order to facilitate the separation of sole assembly 10 from mold assembly 40 after its formation. The release agent may be a spray release agent or any other suitable release agent. Suitable materials for the release agent include, for example, siloxane and water. Other suitable release agents will become readily apparent to those skilled in the art, given the benefit of this disclosure.

Each first preform 56 is positioned within first recess 47 of midsole recess 50 on first portion 42 such that its upper or top surface 60 is positioned adjacent or along a central portion of a corresponding projection 52. In certain embodiments, top surface 60 is positioned approximately midway along a height of projection 52.

In certain embodiments, as illustrated in FIG. 4, a plurality of separate first preforms 56 are positioned in first recess 47 of first portion 42, which combine to form first portion 12 of sole assembly 10. In other embodiments, a single first preform 56 could be positioned in first recess 47 of first portion 42 with a plurality of apertures extending through first preform 56 through which projections 52 would extend.

Each second preform 58 is positioned on top of the first preforms 56 such that its lower or bottom surface 62 is also positioned adjacent or along a central portion of a corresponding projection 52. In certain embodiments, bottom surface 62 is positioned approximately midway along a height of projection 52.

In certain embodiments, as illustrated in FIG. 4, a single second preform 58 is positioned on top of first preforms 56, and includes a plurality of recesses 64 formed on bottom surface 62, each of which receives an upper portion of a corresponding projection 52. In other embodiments, a plurality of second preforms 58 are positioned on top of first preforms 56, and combine to form second portion 14 of sole assembly 10.

Mold assembly 40 is then closed so that first portion 42 is in contact with second portion 44, with first and second preforms 56, 58 seated within midsole recess 50. First portion 42 and second portion 44 may be hinged together, or they may be separate elements that are suitably aligned and placed in contact with one another.

Heat is continued to be supplied to mold assembly 40 with first preform 56 and second preform 58 contained therein for a predetermined period of time. In certain embodiments, mold assembly 40 is heated at a temperature of between approximately 170° C. and 180° C. for approximately 10 minutes, thereby causing first and second preforms 56, 58 to partially melt and bond together to form first portion 12 and second portion 14, respectively, of sole assembly 10, filling midsole recess 50 as seen in FIG. 5. The specific temperature and time period used to form sole assembly 10 in mold assembly 40 can be varied, in known fashion, depending on the particular EVA used.

After this heating step is complete, mold assembly 40 is opened, and sole assembly 10, formed of first portion 12 and second portion 14, expands in known fashion after it is removed from mold assembly 26. Sole assembly 10 then goes through typical stabilization steps, including cooling and trimming, as necessary.

The process of bonding within mold assembly 40, and the expansion of sole assembly 10, can produce bleeding between the different colors of first portion 12 and second portion 14, which may create an uneven bleeding lines at interface 34, as seen in FIG. 1 and discussed above. By positioning top surface 60 of each first preform 56 and bottom surface 62 of each second preform 58 along central portions of projections 52, the interfaces 34 that are formed in channels 28 are less visible from an exterior of sole assembly 10, thereby improving the aesthetics of the footwear.

As noted above, providing different physical properties for first and second preforms 56, 58 and, therefore, first and second portions 12, 14, allows sole assembly 10 to be customized or optimized to provide particular aesthetic and/or performance characteristics.

Figure 6:
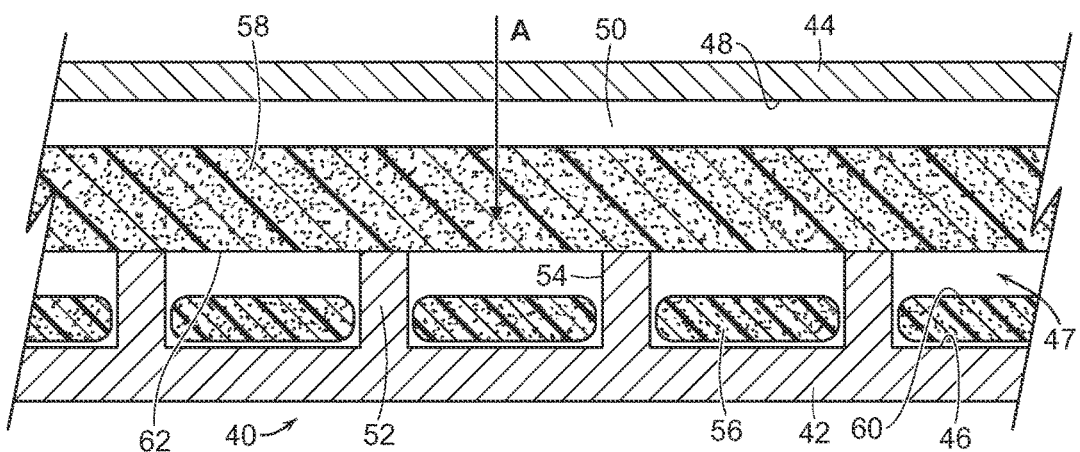
FIG. 6 is a section view of the mold assembly of FIG. 4 with alternative embodiments of the preforms.

Another embodiment is illustrated in FIG. 6. In this embodiment, a compression molding process is used to form sole assembly 10 in mold assembly 40. In this embodiment, first and second preforms 56, 58 are positioned in first recess 47 of first portion 42 when mold assembly 40 is cool. Mold assembly 40 is then closed so that second portion 44 is in contact with first portion 42. In this embodiment, midsole recess 50, and first and second preforms 56, 58 are sized such that first and second preforms 56, 58 are compressed when mold assembly 40 is closed.

Mold assembly 40 is then heated for a predetermined period of time. In certain embodiments, mold assembly 40 is heated at a temperature of between approximately 130° C. and 140° C. for approximately 15 minutes, thereby causing first and second preforms 56, 58 to partially melt and bond together to form first portion 12 and second portion 14, respectively, of sole assembly 10, filling midsole recess 50 as seen in FIG. 5. The specific temperature and time period used to form sole assembly 10 in mold assembly 40 can be varied, in known fashion, depending on the particular EVA used.

While mold assembly 40 is still closed, it is cooled, allowing sole assembly 10 to fully cure and stabilize. This compression molding process provides for sole assembly 10 to have a finished configuration that has the same dimensions as that of midsole recess 50.

Once sole assembly 10 is completely stabilized and cured, mold assembly 40 is opened, and sole assembly is removed from midsole recess 50. Sole assembly 10 may be further finished, such as with trimming.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method of manufacturing a midsole for an article of footwear comprising:
    placing a first preform inside a first recess in a first mold member of a mold assembly, the first mold member including a plurality of projections extending upwardly from a bottom surface of the first recess and positioned inwardly from a peripheral edge of the first recess, wherein the plurality of projections includes a first projection, a second projection, and a third projection, and wherein the first preform is placed on the bottom surface of the first recess between the first projection and the second projection;
    placing a second preform inside the first recess in the first mold member, wherein the second preform is placed on the bottom surface of the first recess between the second projection and the third projection;
    placing portions of a third preform inside the first recess, wherein, prior to closing the mold assembly, the portions of the third preform include: (a) a first portion that extends between the first projection and the second projection, wherein an interface between a top surface of the first preform and a bottom surface of the third preform is positioned adjacent central portions of vertical faces of the first projection and the second projection, and (b) a second portion that extends between the second projection and the third projection, wherein an interface between a top surface of the second preform and the bottom surface of the third preform is positioned adjacent central portions of vertical faces of the second projection and the third projection;
    closing the mold assembly by positioning a second mold member in contact with the first mold member, the first and second mold members cooperating to define a midsole recess;
    maintaining the mold assembly for a predetermined period of time at a predetermined temperature to bond the third preform together with the first preform and the second preform to form a sole assembly within the midsole recess; and
    removing the sole assembly from the mold recess.

2. The method of claim 1, wherein each of the first preform, the second preform, and the third preform is formed of ethyl vinyl acetate.

3. The method of claim 1, wherein a color of the first preform is different than a color of the third preform.

4. The method of claim 1, wherein a physical property of the first preform is different than a physical property of the third preform.

5. The method of claim 1, wherein the mold assembly is at ambient temperature when the first preform, the second preform, and the third preform are placed in the mold assembly, and wherein the first preform, the second preform, and the third preform are compressed when the mold assembly is closed.

6. The method of claim 5, wherein the mold assembly is then heated to a predetermined temperature for a predetermined amount of time, and then cooled to a predetermined temperature.

7. The method of claim 1, wherein the mold assembly is heated when the first preform, the second preform, and the third preforms are placed in the mold assembly, and the mold assembly is then continued to be heated at a predetermined temperature for a predetermined amount of time.

8. The method of claim 1, wherein the bottom surface of the third preform has a plurality of recesses formed therein, each recess receiving a portion of one of the projections.

9. The method of claim 1, wherein the plurality of projections further includes a fourth projection, and wherein the method further comprises:
placing a fourth preform inside the first recess of the first mold member before the closing step, wherein the fourth preform is placed on the bottom surface of the first recess between the third projection and the fourth projection, and wherein in the step of placing portions of the third preform inside the first recess and prior to the closing step, the portions of the third preform further include a third portion that extends between the third projection and the fourth projection, wherein an interface between a top surface of the fourth preform and the bottom surface of the third preform is positioned adjacent central portions of vertical faces of the third projection and the fourth projection.

10. The method of claim 9, wherein the first preform, the second preform, the third preform, and the fourth preform are compressed when the mold assembly is closed.

11. The method of claim 1, wherein the first preform, the second preform, and the third preform are compressed when the mold assembly is closed.

12. A method of manufacturing a midsole for an article of footwear comprising:
placing a first preform inside a first recess in a first mold member of a mold assembly, the first preform having a first color, the first mold member including a plurality of projections extending upwardly from a bottom surface of the first recess and positioned inwardly from a peripheral edge of the first recess;
placing a plurality of additional preforms inside the first recess, at least one of the additional preforms having a different color than the first color;
placing portions of a second preform inside the first recess and positioned on the first preform and the additional preforms, wherein an interface between a top surface of the first preform and a bottom surface of the second preform and each interface between a top surface of each additional preform and the bottom surface of the second preform are positioned adjacent a central portion of a vertical face of one of the projections;
closing the mold assembly by positioning a second mold member in contact with the first mold member, the first and second mold members cooperating to define a midsole recess;
maintaining the mold assembly for a predetermined period of time at a predetermined temperature to bond the preforms together to form a midsole within the midsole recess; and
removing the midsole from the mold recess.

13. The method of claim 12, wherein the mold assembly is heated when the preforms are placed in the mold assembly.

14. The method of claim 12, wherein the mold assembly is subjected to heat after the preforms are placed in the mold assembly and the mold assembly is closed.

15. The method of claim 14, wherein the preforms are compressed within the mold assembly as the mold assembly is closed.

16. A method of manufacturing a midsole for an article of footwear comprising:
placing a first preform inside a first recess in a first mold member of a mold assembly, the first mold member including a plurality of projections extending upwardly from a bottom surface of the first recess and positioned inwardly from a peripheral edge of the first recess;
placing a plurality of additional preforms inside the first recess;
placing portions of a second preform inside the first recess and positioned on the first preform and the plurality of additional preforms, wherein, prior to closing the mold assembly, an interface between a top surface of the first preform and a bottom surface of the second preform and each interface between a top surface of each of the plurality of additional preforms and the bottom surface of the second preform are positioned adjacent a central portion of a vertical face of one of the projections;
closing the mold assembly by positioning a second mold member in contact with the first mold member, the first and second mold members cooperating to define a midsole recess;
maintaining the mold assembly for a predetermined period of time at a predetermined temperature to bond the first preform and the second preform together and to bond the second preform and the plurality of additional preforms together to form the midsole within the midsole recess; and
removing the midsole from the mold recess.

17. The method of claim 16, wherein the mold assembly is heated when the preforms are placed in the mold assembly.

18. The method of claim 16, wherein the mold assembly is subjected to heat after the preforms are placed in the mold assembly and the mold assembly is closed.

19. The method of claim 16, wherein the preforms are compressed within the mold assembly as the mold assembly is closed.

* * * * *